(12) United States Patent
Yang et al.

(10) Patent No.: US 8,901,873 B2
(45) Date of Patent: Dec. 2, 2014

(54) MECHANICAL EQUIPMENT

(71) Applicant: Shenzhen China Star Optoelectronics Technology Co., Ltd., Shenzhen, Guangdong (CN)

(72) Inventors: Guokun Yang, Shenzhen (CN); Chunhao Wu, Shenzhen (CN); Kunhsien Lin, Shenzhen (CN); Minghu Qi, Shenzhen (CN); Zhenhua Guo, Shenzhen (CN); Yongqiang Wang, Shenzhen (CN); Zenghong Chen, Shenzhen (CN); Chenyangzi Li, Shenzhen (CN); Zhiyou Shu, Shenzhen (CN); Weibing Yang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 175 days.

(21) Appl. No.: 13/704,334

(22) PCT Filed: Nov. 23, 2012

(86) PCT No.: PCT/CN2012/085133
§ 371 (c)(1),
(2), (4) Date: Dec. 14, 2012

(87) PCT Pub. No.: WO2014/079035
PCT Pub. Date: May 30, 2014

(65) Prior Publication Data
US 2014/0184130 A1    Jul. 3, 2014

(30) Foreign Application Priority Data
Nov. 21, 2012   (CN) .......................... 2012 1 0476837

(51) Int. Cl.
G05G 5/00      (2006.01)
G05D 3/12      (2006.01)
B65G 43/08     (2006.01)

(52) U.S. Cl.
CPC ................ G05D 3/125 (2013.01); B65G 43/08 (2013.01)
USPC .................. 318/626; 318/400.38; 318/400.01

(58) Field of Classification Search
USPC ............... 318/626, 400.38, 400.01, 519, 652, 318/721, 400.17, 400.25
See application file for complete search history.

(56) References Cited

U.S. PATENT DOCUMENTS 8,004,101 B2 *   8/2011   Aaron ............................. 290/44

\* cited by examiner

*Primary Examiner* — Karen Masih
(74) *Attorney, Agent, or Firm* — Andrew C. Cheng

(57) ABSTRACT

The present invention discloses a mechanical equipment. The sensing member and the sensed member are mounted on the power device, and one of the sensing member and the sensed member is mounted on the output mechanism to move periodically as the output mechanism moving periodically. When each time the sensing member and the sensed member are located relatively at a predetermined position, the control device receives the sensing signal generated when the sensing member senses the sensed member and sends a predetermined control command to the power mechanism when the sensing signals received by the control device reach the threshold value. Therefore, the present invention can achieve controlling the working state of the mechanical equipment and reduce the failure probability of the mechanical equipment at the same time.

18 Claims, 3 Drawing Sheets

MECHANICAL EQUIPMENT

BACKGROUND OF THE INVENTION

1. Field of the Invention

The present invention relates to the mechanical field, and especially relates to mechanical equipment.

2. Description of Related Art

The motor is equipment that converts electrical energy into mechanical energy. In various motors, the most widely used is the asynchronous motor. It is easy to use, reliable operation, low prices and solid structure. The asynchronous motor widely applies in the industrial, the agricultural production, the transportation, the defense and the commerce.

In the motion mechanism using the asynchronous motor as the power source, as shown in FIG. 1, the power system of the motion mechanism is mainly constituted by an asynchronous motor 11 and a speed reducer 12. The asynchronous motor 11 and the speed reducer 12 provide power so that the speed reducer 12 drives a transmission belt 13. In the motion process, when it reaches a specified motion stroke, it is usually required to control the asynchronous motor 11 to stop working for stopping the motion of the transmission belt 13.

The control principle is mainly mounting a sensor 16 respectively at an initial position 14 of the motion stroke of the transmission belt 13 and an end position 15. A sensed object 17 is the mounted on the transmission belt 13 to move as the motion of the transmission belt 13. And the sensed object 17 is located between the initial position 14 and the end position 15 of the motion stroke. When the sensed object 17 reaches one of the sensors 16, the sensor 16 senses the sensed object 17 and sends a sensing signal to a control device 18 in order to stop the motion of the transmission belt 13 so that actual motion stroke of the transmission belt 13 would not exceed a predetermined motion stroke.

Through the above way, it can realize the control of the asynchronous motor 11. However, the sensors 16 at the initial position 14 and the end position 15 become essential elements, and they are mounted outside the power system. During equipment maintenance, the maintenance man may touch accidentally the sensors 16 or damage the sensors 16. Therefore, the sensors 16 do not work and cause the failure of the equipment.

SUMMARY OF THE INVENTION

The technical problem solved by the present invention is to provide mechanical equipment capable of reducing the failure probability of the equipment and increasing the reliability of the equipment.

In order to solve the above-mentioned technical problem, a technical solution provided by the present invention is: a mechanical equipment comprising: a control device having a signal counter and a signal amplifier; a power device having: an output mechanism; and a power mechanism having: a power unit; and a rotary unit; wherein, the power unit connects with the rotary unit to provide the power to the rotary unit, and the rotary unit connects to the output mechanism for driving the output mechanism to move periodically; a positioning device fixed on the power device and having a sensing member and at least one sensed member, and one of the sensing member and the sensed member is fixed on the rotary unit, and the other of the sensing member and the sensed member is fixed on the output mechanism to move periodically as the output mechanism moving periodically; wherein, when each time the sensing member and the sensed member are located relatively at a predetermined position, the signal amplifier receives and processes a sensing signal generated when the sensing member senses the sensed member and forms a processed sensing signal, and the signal amplifier transmits the processed sensing signal to the signal counter, and the signal counter accumulates the number of the processed sensing signals and sends a predetermined control signal to the power mechanism when the number of the processed sensing signals received by the signal counter reaches a threshold value.

Wherein, the output mechanism is an output shaft, and the sensing member is fixed on the power mechanism, and the sensed member is fixed on the output shaft to rotate as the output shaft rotating, and when the sensed member rotate at a position opposite to the sensing member, the control device receives the sensing signal generated when the sensing member senses the sensed member and sends the predetermined control signal of stopping rotating the output shaft when the number of the sensing signals received by the control device reaches the threshold value.

Wherein, the positioning device comprises a sensed member mounting ring fixed on the output shaft and rotating with the rotation of the output shaft, and the number of the sensed member is two, and the two sensed members are respectively fixed to a first position and a second position of the sensed member mounting ring for respectively passing through a position opposite to the sensing member when the sensed member mounting ring is rotating.

Wherein, the output mechanism is an output shaft, and the sensed member is fixed on the power mechanism, and the sensing member is fixed on the output shaft to rotate as the output shaft rotating, and when the sensing member rotate at a position opposite to the sensed member, the control device receives the sensing signal generated when the sensing member senses the sensed member and sends the predetermined control signal of stopping rotating the output shaft to the power mechanism when the number of the sensing signals received by the control device reaches the threshold value.

Wherein, the number of the sensed member is two, and the two sensed members are respectively fixed to a first position and a second position of the power mechanism for respectively passing through positions opposite to the two sensed members when the sensing member is rotating.

Wherein, the power unit is an asynchronous motor and the rotary unit is a speed reducer.

Wherein, the signal counter is a pulse counter.

Wherein, the mechanical equipment is for manufacturing a flat display device.

In order to solve the above-mentioned technical problem, another technical solution provided by the present invention is: a mechanical equipment comprising: a control device; a power device having an output mechanism and a power mechanism; and a positioning device fixed on the power device and having a sensing member and at least one sensed member, and one of the sensing member and the sensed member is fixed on the power mechanism, and the other of the sensing member and the sensed member is fixed on the output mechanism to move periodically as the output mechanism moving periodically; wherein, each time when the sensing member and the sensed member are located relatively at a predetermined position, and the control device receives a sensing signal generated when the sensing member senses the sensed member, and sends a predetermined control signal to the power mechanism when the number of the sensing signals received by the control device reaches a threshold value.

Wherein, the output mechanism is an output shaft, and the sensing member is fixed on the power mechanism, and the sensed member is fixed on the output shaft to rotate as the output shaft rotating, and when the sensed member rotate at a position opposite to the sensing member, the control device receives the sensing signal generated when the sensing member senses the sensed member and sends the predetermined control signal of stopping rotating the output shaft to power mechanism when the number of the sensing signals received by the control device reaches the threshold value.

Wherein, the positioning device comprises a sensed member mounting ring fixed on the output shaft and rotating with the rotation of the output shaft, and the number of the sensed members is two, and the two sensed members are respectively fixed to a first position and a second position of the sensed member mounting ring for respectively passing through a position opposite to the sensing member when the sensed member mounting ring is rotating.

Wherein, the output mechanism is an output shaft, and the sensed member is fixed on the power mechanism, and the sensing member is fixed on the output shaft to rotate as the output shaft rotating, and when the sensing member rotate at a position opposite to the sensed member, the control device receives the sensing signal generated when the sensing member senses the sensed member and sends the predetermined control signal of stopping rotating the output shaft to the power mechanism when the number of the sensing signals received by the control device reaches the threshold value.

Wherein, the number of the sensed member is two, and the two sensed members are respectively fixed to a first position and a second position of the power mechanism for respectively passing through positions opposite to the two sensed members when the sensing member is rotating.

Wherein, the power mechanism comprises a power unit and a rotary unit, and the power unit connects with the rotary unit to provide the power to the rotary unit, and the rotary unit connects to an output shaft for driving the output shaft to rotate, and one of the sensing member and the sensed member is fixed on the output shaft, and the other of the sensing member and the sensed member is fixed on the rotary unit.

Wherein, the power unit is an asynchronous motor and the rotary unit is a speed reducer.

Wherein, the control device comprises a signal counter and a signal amplifier, and the signal amplifier receives and processes the sensing signal generated when the sensing member senses the sensed member and forms a processed sensing signal and transmits the processed sensing signal to the signal counter, and the signal counter accumulates the number of the processed sensing signals and sends the predetermined control signal to the power mechanism when the number of the processed sensing signals received by the signal counter reaches the threshold value.

Wherein, the signal counter is a pulse counter.

Wherein, the mechanical equipment is for manufacturing a flat display device.

The beneficial effect of the present invention is: comparing to the prior art, in the mechanical equipment of the present invention, one of the sensing member and the sensed member moves periodically as the output mechanism moving periodically. In the moving process, when each time the sensing member and the sensed member are located relatively at a predetermined position, the control device receives the sensing signal generated when the sensing member senses the sensed member. When the received sensing signals reach the threshold value, it indicates that the motion stroke of the output mechanism has reaches the specified motion stroke. At this time, the control device sends a control command for controlling the power mechanism stop driving the output mechanism in order to realize the control of the power mechanism.

At the same time, the sensing member and the sensed member are mounted on the power device, not outside the power device. Therefore, it can effectively protect them from destroying easily in order to reduce the failure probability of the equipment and increase the reliability of the equipment.

DETAILED DESCRIPTION OF THE PREFERRED EMBODIMENT

The following content combines with the drawings and the embodiment for describing the present invention in detail.

Figure 1:
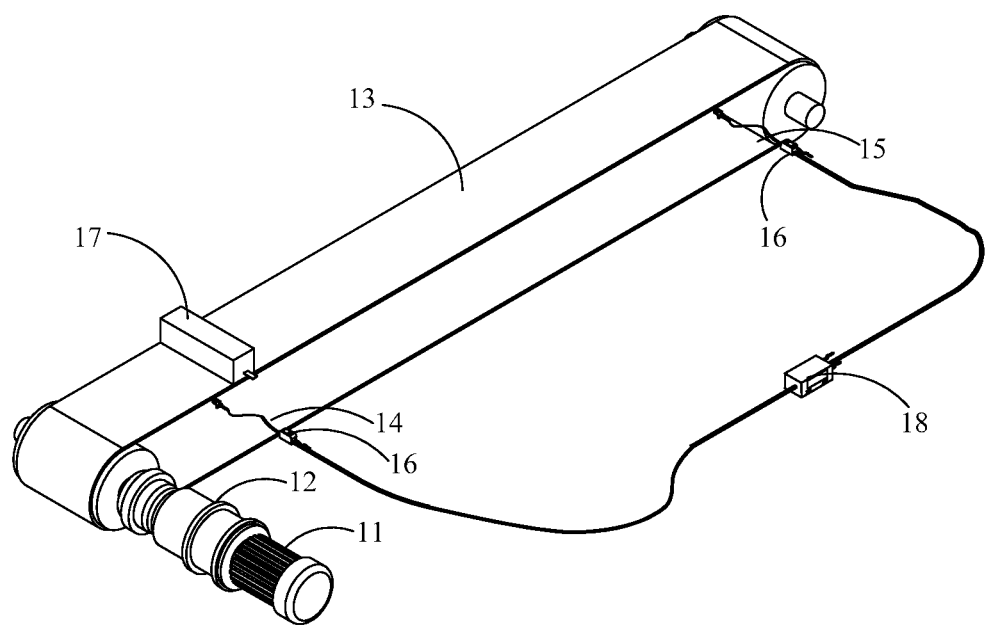
FIG. 1 is a schematic diagram of a motion mechanism using an asynchronous motor as the power source in the prior art.
Figure 2:
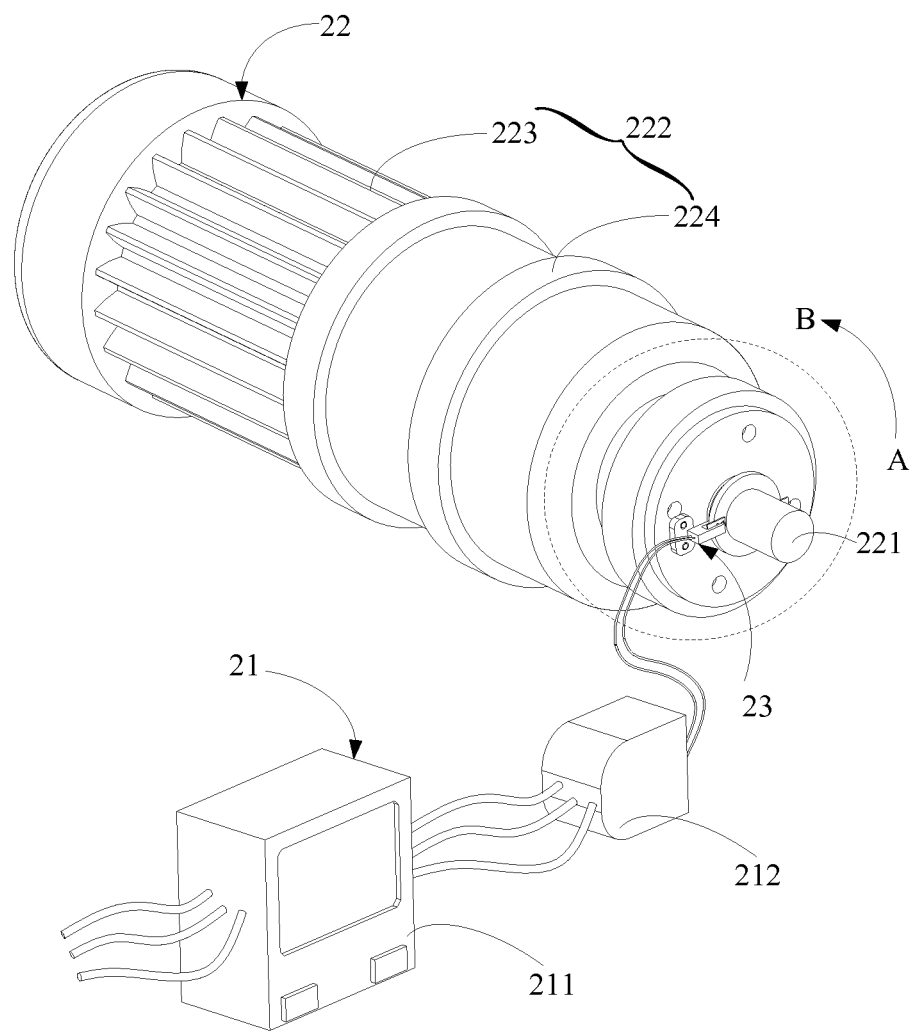
FIG. 2 is a schematic diagram of a mechanical equipment of one embodiment of the present invention.
Figure 3:
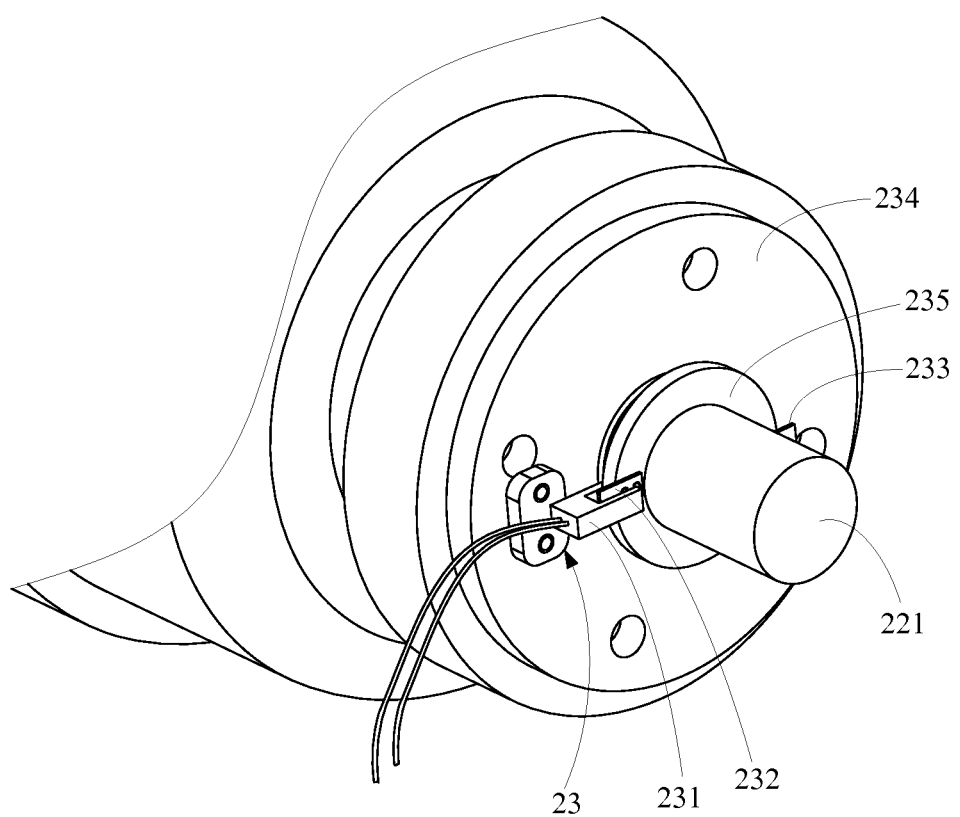
FIG. 3 is an enlarged schematic view of the dotted line portion of the mechanical equipment in FIG. 2.

With reference to FIG. 2 and FIG. 3, in one embodiment of a mechanical equipment of the present invention, the mechanical equipment is used for manufacturing a flat panel display device, and it includes a control device 21, a power device 22, and a positioning device 23 fixed on the power device 22.

Wherein, the power device 22 includes an output shaft 221 as an output mechanism and a power mechanism 222 for driving the output shaft 221 to move periodically. Specifically, the power mechanism 222 further includes a power unit 223 and a rotary unit 224. The power unit 223 functions as a power source of the power mechanism 222 and it connects with the rotary unit 224 to provide the power to the rotary unit 224. The output shaft 221 is installed at an output terminal of the rotary unit 224, and the periodic motion of the output shaft 221 is rotating circumferentially. When the power unit 223 is providing the power for the rotary unit 224, the rotary unit 224 drives the output shaft 221 rotating.

In the present embodiment, the positioning device 23 comprises a sensing member 231 and two sensed members. The two sensed members are respectively a first sensed member 232 and a second sensed member 233. The sensing member 231 is fixed to the rotary unit 224 of the power mechanism 222, and the two sensed member 232, 233 are fixed on the output shaft 221 to move periodically as the output shaft 221 rotating periodically.

Specifically, the positioning device 23 further comprises a sensing member mounting ring 234 and a sensed member mounting ring 235. The sensing member mounting ring 234 is fixed on the rotary unit 224 and not rotates with the rotation of the output shaft 221. The sensed member mounting ring 235 is fixed on the output shalt 221 and rotates with the rotation of the output shaft 221. Wherein, the sensing member 231 is mounted on the sensing member mounting ring 234 to fix on the rotary unit 224 through the sensing member mounting ring 234. The first sensed member 232 and the second sensed member 233 are respectively mounted to the sensed member mounting ring 235 at a first position and a second position to fix on the output shaft 221 through the sensed member mounting ring 235. The first and second positions are the middle symmetric positions of sensed member mounting ring 235, that is, two boundary ends of the semicircle of the sensed member mounting ring 235.

When the output shaft 221 rotates periodically, it drives the sensed member mounting ring 235 to rotate, and the first sensed member 232 and the second sensed member 233 also follow it to rotate. When each time the first sensed member 232, the second sensor member 233, and the sensing member 231 are located in a relative predetermined position, the sensing member 231 respectively senses the two sensed members 232 and 233. Wherein the relative predetermined position is that sensing member 231 is respectively opposite to the sensed member 232, 233. When the first sensed member 232 rotates oppositely to the sensing member 231, the sensing member 231 senses the first sensed member 232 and generates a sensing signal. The control device 21 receives the sensing signal. When the second sensor member 233 rotates oppositely to the sensing member 231, the sensing member 231 senses the second sensed member 233 and generates a sensor signal, the control device 21 receives the sensing signal. In the present embodiment, the first sensed member 232 and the second sensed member 233 is the same sensed member so that the sensing signals sending from the sensing member 231 to the control device 21 are the same.

The control device 21 includes a signal counter 211, and a signal amplifier 212. The signal counter 211 may be a pulse counter, and the sensing signal generated by the sensing member 231 is correspondingly a pulse signal. Wherein, the signal amplifier 212 is for receiving the sensing signal generated by the sensing member when it respectively senses the first sensed member 232 and the second sensed member 233. After processing the sensing signal, it forms a processed sensing signal and transmits the processed sensing signal to the signal counter 211.

The signal counter 211 receives the sensing signal transmitted by the signal amplifier 212, and accumulates the number of received sensing signals. The signal counter 211 sends a predetermined control signal to the power unit 223 of the power mechanism 222 for controlling the working state of the power unit 223 when the received sensing signals reach a threshold value.

It can be understood that in actual application, the periodic motion of the output shaft 221 drives a transmission belt (not shown) to move. When the motion stroke of the transmission belt reaches a specified stroke, it controls the output shaft 221 to stop rotating for stopping the motion of the transmission belt and for avoiding the stroke of the transmission belt beyond a predetermined motion stroke. The number of the rotating turns of the output shaft 221, the number of sensing signals generated by the sensing member 231, and the motion stroke of the transmission belt has a certain relationship. During the rotation process of the output shaft 221, the rotation turn number of the output shaft 221 determines the motion stroke of the transmission belt, and the rotation turn number of the output shaft 221 can be known by the number of the sensing signals generated by the sensing member 231, that is, when the output shaft 221 rotates one turn, the sensing member 231 generates two sensing signals.

Therefore, in order to make the motion stroke of the transmission belt does not exceed a specified motion stroke. By controlling the rotation turn of the output shaft 221 to control the motion stroke of the transmission belt. When the signal counter 211 receives the sensing signals which are reaching a preset threshold value, it indicates that the motion stroke of the transmission belt has reaches the specified motion stroke. At this time, it sends a control command to the power unit 223 to make the power unit 223 stop working in order to stop the rotation of the output shaft 221.

For example, when the predetermined motion stroke of the transmission belt is 10.5 m, and the output shaft 221 rotates one turn for corresponding to 1 m motion stroke of the transmission belt. Therefore, the output shaft 221 requires rotating 10.5 turns to make the motion stroke of the transmission belt reach the specified motion stroke. Each rotation of the output shaft 211, the sensing member 231 generates two sensing signals. For the output shaft 211 rotating by 10.5 turns, the sensing member 231 generates 21 sensing signals. Therefore, in the initial design, the threshold value of the signal counter 211 is set to 21. In the present embodiment, it uses the two sensed members 232 and 233 and the sensing member 231 for sensing, and when the first sensed member 232 and the second sensed member 233 are located at the intermediate symmetrical positions of the sensed mounting ring 235 so that the sensing member 231 can generate one sensing signal when the output shaft 221 rotates half turn. It does not require the output shaft 221 to rotate a complete turn for generating one sensing signal. In other words, through the two sensed members 232 and 233 respectively sensed by the sensing member 231, it is possible to know a semicircle rotation of the output shaft 221 by the number of the sensing signals.

When the output shaft 221 rotate along the AB direction to drive the transmission belt to move, and the first sensed member 232 and the second sensed members 233 are rotated to the position opposite to the sensing member 231, the sensing member 231 generates the sensor signal and the signal counter 211 receives the sensor signal through the signal amplifier 212, while accumulate number of the received sensing signals. When the number of the sensing signals received by the signal counter 211 is accumulated to be 21, the output shaft 221 is rotated by 10.5 turns. The motion stroke of the transmission belt driven by the output shaft 221 motion corresponds to 10.5 meter. It indicates that the motion stroke of the transmission belt reaches the specified motion stroke. The signal counter 211 sends the control signal to the power unit 223 to make the power unit 223 stop working. Thereby, it makes the output shaft 221 stop rotating and also the transmission belt. The method for controlling the working state of the power unit 223 is equally applicable to the output shaft 221 along the reverse AB direction. It will not repeat here.

Of course, the first sensed member 232 and the second sensed member 233 can also be fixed at two arbitrary positions of the sensed mounting ring 235, and it is not limited to the above embodiment of the symmetrical positions. For example, the first sensed member 232 and the second sensed member 233 are located one-third distance of the circumference along the AB direction. At this time, it can acquire rotating one-third turn of the output shaft 221 by reading the number of the sensing signals. The specific settings can be carried out according to the specific predetermined motion stroke, and the present invention will not limit it here. In addition, the periodic motion of the output shaft 221 is not limited to the above-described circular rotation. It may be other motion such as vibration and so on. The present invention shall not be specifically limited.

The power unit 223 of the present embodiment is an asynchronous motor, and the rotating unit 224 is a speed reducer.

By the above-described method, the mechanical equipment of the present embodiment can realize the control for the power unit 223 in order to control the output shaft 221 to rotate or not. At the same time, in the present embodiment, the positioning devices 23 is mounted on the power device 22 such that during maintenance or repairmen of the equipment, it is not easy to cause damage to the positioning device 23 because of the human factor. Therefore, it effective protects the positioning device 23 and it is capable to reduce the chance of equipment failure.

In the above-described embodiment, the two sensed members 232 and 233 are the same. In another embodiment, they may not be the same such that the different sensing signals are generated when the sensing member respectively senses the sensed member. For example, using two different sensed members such that a sensing signal generated when the sensing member senses one sensed member is greater than another sensing signal generated when the sensing member senses the other sensed member to distinguish the different sensing signals.

In this embodiment, for the forward rotation and reverse rotation of the output shaft, the control device sends the predetermined control signal to the rotary unit respectively through the different number of the sensing signals. Specifically, in the forward rotation of the output shaft and the two sensed member respectively passing through the position of the sensing member, the sensing member respectively senses the two sensed member and generates different sensing signals. The control device receives only one of the two sensing signals and accumulates the number of the received sensing signals. When the accumulative sensing signals received by the control device reach a threshold value, the motion stroke of the transmission belt the driven by the output shaft has reaches a specified motion stroke. At this time, the control device sends a control command to stop rotating the output shaft. In the reverse rotation, the control device receives only the other of the two sensing signals and accumulates the number of the received sensing signals. When the accumulative sensing signals received by the control device reach a threshold value, the motion stroke of the transmission belt the driven by the output shaft has reaches a specified motion stroke. At this time, the control device sends a control command to stop rotating the output shaft The present invention also provides another embodiment of the mechanical equipment, in this embodiment, the sensing member of the positioning device is fixed on the output shaft to rotate as the output shaft rotating. The sensed member is fixed on the power mechanism. Specifically, the number of the sensed member is two, and the sensed member mounting ring of the positioning device is fixed on the power mechanism, the two sensed member are respectively fixed on a first and second positions of the sensed member mounting ring so that the sensed members are fixed to the power mechanism. When the sensing member rotates as the rotation of the output shaft, the sensing member respectively passes through positions opposite to the two sensed member to respectively generate sensing signals. The control device receives the sensing signal generated when the sensing member senses the sensed member and accumulates the number of the received sensing signals. When the accumulative sensing signals received by the control device reach a threshold value, the control device sends a control signal to the power mechanism to stop rotating the output shaft.

For the position setting of the first sensed member and the second sensed member, they can be set in the middle symmetric positions of the sensed member mounting ring and may be set at the other positions. In particular, they can be set in accordance with a specified motion stroke of the transmission belt. Wherein the sensing signal generated by the sensing member can be transmitted by wireless transmission to the control device in order to avoid that the connection line in the wired transmission mode will be rotated therewith.

By the above-described manner, the present embodiment can achieve the control function of the power mechanism and the positioning device is mounted on the power device. Therefore, it can effectively protect the positioning device from destroying easily in order to reduce the failure probability of the equipment.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A mechanical equipment comprising:
   a control device having a signal counter and a signal amplifier;
   a power device having:
      an output mechanism; and
      a power mechanism having:
         a power unit; and
         a rotary unit;
         wherein, the power unit connects with the rotary unit to provide the power to the rotary unit, and the rotary unit connects to the output mechanism for driving the output mechanism to move periodically;
   a positioning device fixed on the power device and having a sensing member and at least one sensed member, and one of the sensing member and the sensed member is fixed on the rotary unit, and the other of the sensing member and the sensed member is fixed on the output mechanism to move periodically as the output mechanism moving periodically;
   wherein, when each time the sensing member and the sensed member are located relatively at a predetermined position, the signal amplifier receives and processes a sensing signal generated when the sensing member senses the sensed member and forms a processed sensing signal, and the signal amplifier transmits the processed sensing signal to the signal counter, and the signal counter accumulates the number of the processed sensing signals and sends a predetermined control signal to the power mechanism when the number of the processed sensing signals received by the signal counter reaches a threshold value.

2. The mechanical equipment according to claim 1, wherein, the output mechanism is an output shaft, and the sensing member is fixed on the power mechanism, and the sensed member is fixed on the output shaft to rotate as the output shaft rotating, and when the sensed member rotate at a position opposite to the sensing member, the control device receives the sensing signal generated when the sensing member senses the sensed member and sends the predetermined control signal of stopping rotating the output shaft when the number of the sensing signals received by the control device reaches the threshold value.

3. The mechanical equipment according to claim 2, wherein, the positioning device comprises a sensed member mounting ring fixed on the output shaft and rotating with the rotation of the output shaft, and the number of the sensed member is two, and the two sensed members are respectively fixed to a first position and a second position of the sensed member mounting ring for respectively passing through a position opposite to the sensing member when the sensed member mounting ring is rotating.

4. The mechanical equipment according to claim 1, wherein, the output mechanism is an output shaft, and the sensed member is fixed on the power mechanism, and the sensing member is fixed on the output shaft to rotate as the output shaft rotating, and when the sensing member rotate at a position opposite to the sensed member, the control device receives the sensing signal generated when the sensing member senses the sensed member and sends the predetermined control signal of stopping rotating the output shaft to the power mechanism when the number of the sensing signals received by the control device reaches the threshold value.

5. The mechanical equipment according to claim 4, wherein, the number of the sensed member is two, and the two sensed members are respectively fixed to a first position and a second position of the power mechanism for respectively passing through positions opposite to the two sensed members when the sensing member is rotating.

6. The mechanical equipment according to claim 1, wherein, the power unit is an asynchronous motor and the rotary unit is a speed reducer.

7. The mechanical equipment according to claim 1, wherein, the signal counter is a pulse counter.

8. The mechanical equipment according to claim 1, wherein, the mechanical equipment is for manufacturing a flat display device.

9. A mechanical equipment comprising:
a control device;
a power device having an output mechanism and a power mechanism; and
a positioning device fixed on the power device and having a sensing member and at least one sensed member, and one of the sensing member and the sensed member is fixed on the power mechanism, and the other of the sensing member and the sensed member is fixed on the output mechanism to move periodically as the output mechanism moving periodically;
wherein, each time when the sensing member and the sensed member are located relatively at a predetermined position, and the control device receives a sensing signal generated when the sensing member senses the sensed member, and sends a predetermined control signal to the power mechanism when the number of the sensing signals received by the control device reaches a threshold value.

10. The mechanical equipment according to claim 9, wherein, the output mechanism is an output shaft, and the sensing member is fixed on the power mechanism, and the sensed member is fixed on the output shaft to rotate as the output shaft rotating, and when the sensed member rotate at a position opposite to the sensing member, the control device receives the sensing signal generated when the sensing member senses the sensed member and sends the predetermined control signal of stopping rotating the output shaft to power mechanism when the number of the sensing signals received by the control device reaches the threshold value.

11. The mechanical equipment according to claim 10, wherein, the positioning device comprises a sensed member mounting ring fixed on the output shaft and rotating with the rotation of the output shaft, and the number of the sensed members is two, and the two sensed members are respectively fixed to a first position and a second position of the sensed member mounting ring for respectively passing through a position opposite to the sensing member when the sensed member mounting ring is rotating.

12. The mechanical equipment according to claim 9, wherein, the output mechanism is an output shaft, and the sensed member is fixed on the power mechanism, and the sensing member is fixed on the output shaft to rotate as the output shaft rotating, and when the sensing member rotate at a position opposite to the sensed member, the control device receives the sensing signal generated when the sensing member senses the sensed member and sends the predetermined control signal of stopping rotating the output shaft to the power mechanism when the number of the sensing signals received by the control device reaches the threshold value.

13. The mechanical equipment according to claim 12, wherein, the number of the sensed member is two, and the two sensed members are respectively fixed to a first position and a second position of the power mechanism for respectively passing through positions opposite to the two sensed members when the sensing member is rotating.

14. The mechanical equipment according to claim 9, wherein, the power mechanism comprises a power unit and a rotary unit, and the power unit connects with the rotary unit to provide the power to the rotary unit, and the rotary unit connects to an output shaft for driving the output shaft to rotate, and one of the sensing member and the sensed member is fixed on the output shaft, and the other of the sensing member and the sensed member is fixed on the rotary unit.

15. The mechanical equipment according to claim 14, wherein, the power unit is an asynchronous motor and the rotary unit is a speed reducer.

16. The mechanical equipment according to claim 9, wherein, the control device comprises a signal counter and a signal amplifier, and the signal amplifier receives and processes the sensing signal generated when the sensing member senses the sensed member and forms a processed sensing signal and transmits the processed sensing signal to the signal counter, and the signal counter accumulates the number of the processed sensing signals and sends the predetermined control signal to the power mechanism when the number of the processed sensing signals received by the signal counter reaches the threshold value.

17. The mechanical equipment according to claim 16, wherein, the signal counter is a pulse counter.

18. The mechanical equipment according to claim 9, wherein, the mechanical equipment is for manufacturing a flat display device.

* * * * *